Feb. 16, 1937. M. W. FISH ET AL Re. 20,268

REFRIGERATING APPARATUS

Original Filed Jan. 29, 1930 2 Sheets-Sheet 1

Inventors
Mortimer W. Fish
Harry F. Clark
By Spencer Hardman and Fehr
Attorneys

Feb. 16, 1937. M. W. FISH ET AL Re. 20,268

REFRIGERATING APPARATUS

Original Filed Jan. 29, 1930 2 Sheets-Sheet 2

Inventors
Mortimer W. Fish
Harry F. Clark
By Spencer Hardman and Fehr
Attorneys

Reissued Feb. 16, 1937

Re. 20,268

UNITED STATES PATENT OFFICE 20,268

REFRIGERATING APPARATUS

Mortimer W. Fish and Harry F. Clark, Dayton, Ohio, assignors, by mesne assignments, to General Motors Corporation, a corporation of Delaware Original No. 1,883,891, dated October 25, 1932, Serial No. 424,333, January 29, 1930. Application for reissue August 30, 1934, Serial No. 742,140

2 Claims. (Cl. 200—124)

This invention relates to refrigerating apparatus and more particularly to a self-soldering circuit breaking device for use in refrigerating apparatus.

Among its objects this invention contemplates the construction of an improved, rugged, efficient and easily assembled circuit breaking device having but few parts.

A further object of this invention is to provide a self-soldering device wherein a coil is arranged in heat-exchange relation with the shaft carrying a part of the locking mechanism, which coil, upon the passage of excessive current, is adapted to heat the shaft to melt the solder to release the said locking means.

Further objects and advantages of the present invention will be apparent from the following description, reference being had to the accompanying drawings, wherein a preferred form of the present invention is clearly shown.

Figure 1:
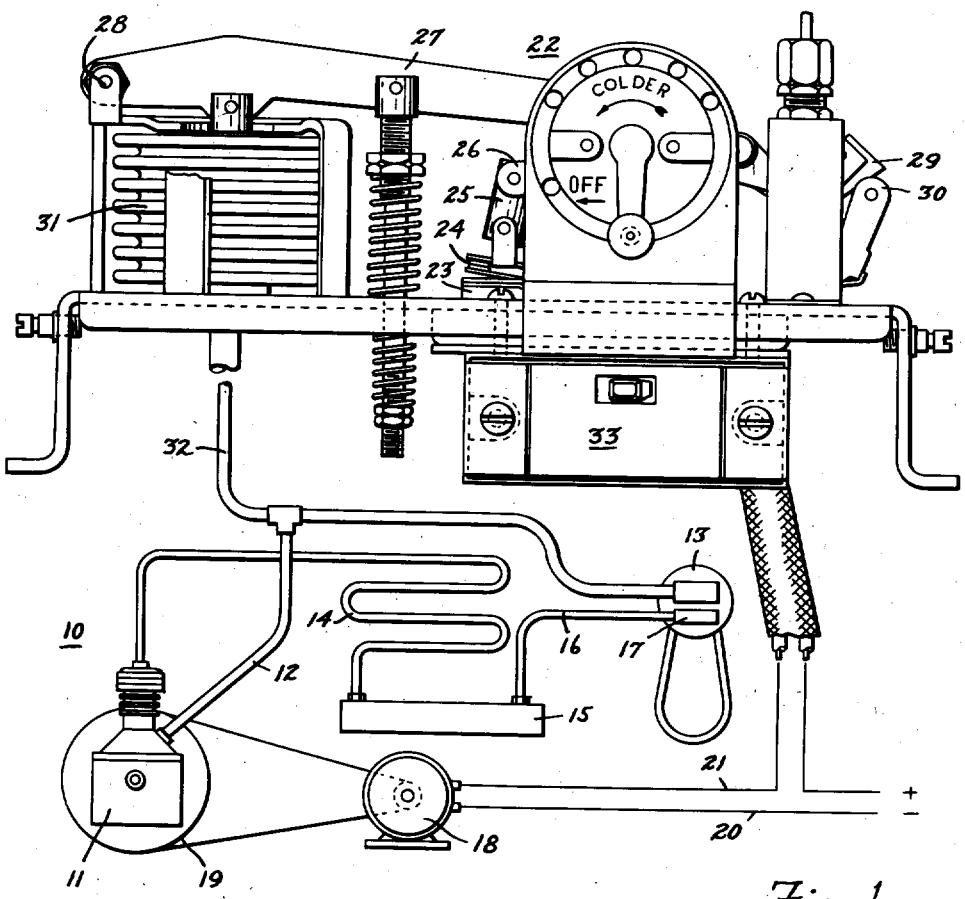
Fig. 1 is a diagrammatic showing of a refrigerating system with the switch and circuit breaking device shown in elevation.

Referring to the drawings and more specifically to Fig. 1, we have disclosed a refrigerating system generally indicated at 10, comprising a compressor 11 whose suction side is connected through the conduit 12 with the evaporator 13. The compressor 11 is connected on its discharge side to the condenser 14 which in turn is connected to a receiver 15. The receiver is connected by a conduit 16 with the inlet 17 to the evaporator. In operation refrigerant is withdrawn from the evaporator 13 through the conduit 12 by the compressor 11 wherein it is compressed and discharged into the condenser 14. The compressed refrigerant is liquefied in the condenser 14 either by the cooling effect of air or the cooling effect of water and is collected in liquid form in the receiver 15 from where it passes in liquid form to the evaporator 13. The evaporator 13 is of the type wherein the inlet is controlled by a float valve responsive to a certain level of liquid refrigerant therein. This type of evaporator is disclosed in the patent to R. G. Osborn, 1,556,708, patented October 13, 1925.

The compressor 11 is driven by an electric motor 18 through the medium of the belt and pulley connection 19 and the motor is connected to a source of power through the lead lines 20 and 21.

In the operation of a refrigerating apparatus of this type it is desirable to maintain the evaporator within certain predetermined limits of temperature. This may be accomplished, as herein disclosed, by means of a switch generally indicated at 22 for starting and stopping the motor 18 at predetermined high and low pressures respectively. This switch has not been shown in detail for the reason that the details thereof form no part of the present invention. Such details have been disclosed in an application of Otto M. Summers, Serial No. 281,599, filed May 30, 1928, and reference thereto is hereby made for a more complete description thereof. In this case it is sufficient to state that the switch comprises a stationary contact 23, a movable contact 24, a link 25, and a lever 26 connecting the link 25 and the lever 27, said lever 27 being pivoted at its left hand end at 28 and at its right hand end being provided with a cam surface 29 adapted to engage the surface of the pivoted link 30. A bellows 31, the interior of which is in communication with the evaporator through the conduit 32 is operatively connected at its upper end to the lever 27. All the various parts of the switch enumerated are suitably mounted on a supporting base.

In operation, an increase in pressure within the evaporator 13 corresponding to an increase in temperature therein, will cause the bellows 31 to expand, thereby lifting the lever 27 and causing the right hand cam surface 29 to ride over the surface 30 to snap the contact 24 into engagement with the contact 23. As the pressure within the evaporator decreases, due to the action of the compressor, the bellows 31 will contract and at the predetermined low pressure will cause a reverse movement of the lever 27 to disengage the contacts 23 and 24.

Figure 2:
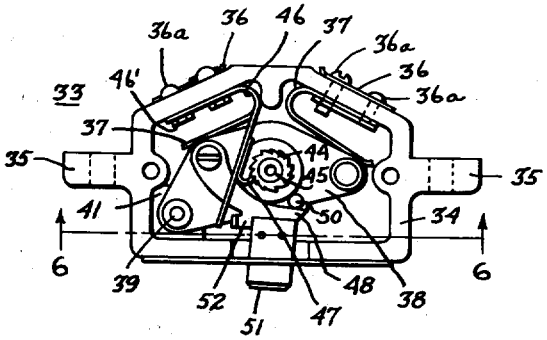
Fig. 2 is a top plan view of the circuit breaking device shown in Fig. 1.
Figure 6:
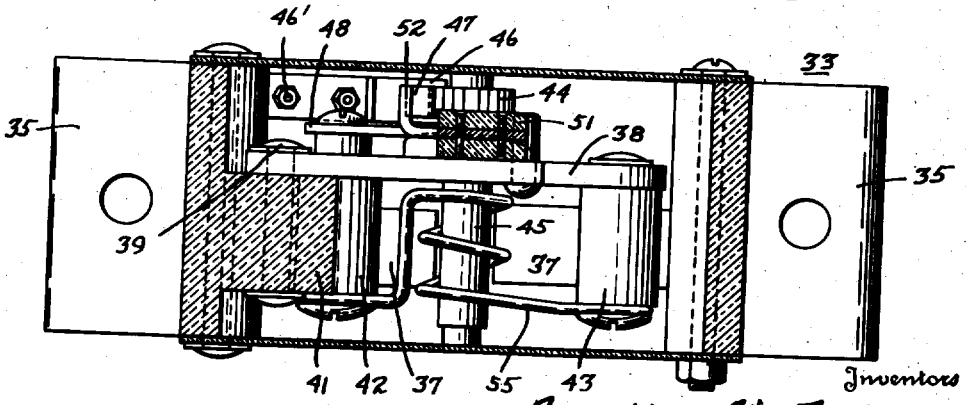
Fig. 6 is an enlarged view in section taken on the line 6—6 of Fig. 2.

To prevent injury to the motor, due to excessive current flowing through the leads 20 and 21, a thermal cutout device comprising a self-soldering switch is interposed in the lead line 21 as shown generally at 33. This device may be conveniently mounted on the frame supporting the switch or may be supported anywhere else in the power line as desired. In Figs. 2 and 6 which are views of the device shown at 33 in Fig. 1, a cutout device is shown as comprising an insulating housing 34 provided with a removable front panel and with lugs 35 for attaching the housing to the frame supporting the switch or to any other supporting structure. Terminals 36 are mounted on the exterior rear face of the housing 34 by means of the bolts 36a passing through the housing, which bolts also secure on the inside face of the housing, the contacts 37. A plate 38, pivoted at 39 to a rearwardly extending lug 41 within the housing, carries on its under face the two contacts 42 and 43 connected by a wire 55. A ratchet 44 is supported on the upper side of the plate by means of a shaft 45 to which the ratchet 44 is soldered, which shaft passes through and is secured to the plate. On the underside of the plate 38 the shaft is surrounded by the wire 55 connecting the contacts 42 and 43. A spring 46, carrying the pawl 47, is secured to the rear face of the housing as at 46', the pawl 47 being adapted to engage the ratchet 44 to hold the plate in the position shown in Fig. 2. Pivoted to the plate 38 is a lever 48 carrying the lug 51 extending through an opening in the front wall of the housing. This lever engages a stop member 50 carried by the plate 38 so as to impart movement to the plate when the lug 51 is pushed inwardly. The lever 48 also carries a laterally extending lug 52, which, on lateral movement of the lug 51 and lever 48, is adapted to engage the extremity of the spring 46 to disengage the pawl 47 from the ratchet 44. This provides manually operative means for interrupting the flow of current through the contacts so that the device disclosed may also be used as an ordinary switch as well as a safety switch. Also it should be noted that by providing the lug 52 on the lever 48, the same means that is utilized to set the switch or cut-out device, may also be used to open the switch manually.

In operation, the ratchet 44 is soldered to the shaft 45. The lug 51 is pushed inwardly, causing the lever 48 to engage the stop member 50 on the plate 38. This movement of the lug 51 will cause the plate 38 to rotate counter-clockwise about its pivot point 39 and will bring the contacts 37 into engagement with the contacts 42 and 43. The pawl 47 will engage the ratchet 44 to hold the contacts in engagement. Current will now flow through the contacts and the cutout device will remain closed as long as the current flowing remains normal. An abnormal flow of current will cause a heating of the connection 55 between the contacts 42 and 43. Heating of this connection 55 will cause a heating of the shaft 45 which in turn will melt the solder holding the ratchet to the shaft 45. Melting of the solder will allow the ratchet 44 to rotate on the shaft 45, allowing the plate to rotate in a clockwise direction under the influence of the spring contact 37. This movement will disengage contact 37 from contact 43, breaking the circuit therethrough. As soon as the current stops, the solder will again cool and solidify, whereby the plate may again be locked in position. If at any time it is desired to break the circuit, the lever 48 may be moved laterally by the lug 51, causing the lug 52 to engage the spring 46 to disengage the pawl 47 from the ratchet 44.

The salient features of this cut-out device are the providing of the heating coil around the shaft or in any other position to cause a slight heat lag; that is to say to provide means whereby a period of time will elapse between the heating of the wire 55 and the melting of the solder. Another is the provision of the same means for both moving the contacts into engaging position and for manually disconnecting the contacts.

Other devices for accomplishing these results have been shown in the remaining figures, and are hereinafter more fully described. They constitute, however, but a few exemplifications of how these functions may be had.

Figure 3:
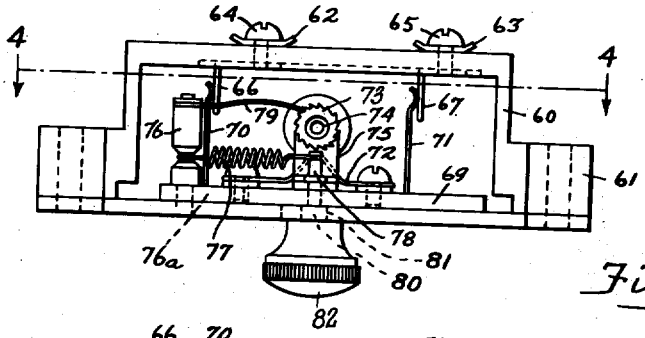
Fig. 3 is a top plan view of a modified form of circuit breaking device.
Figure 4:
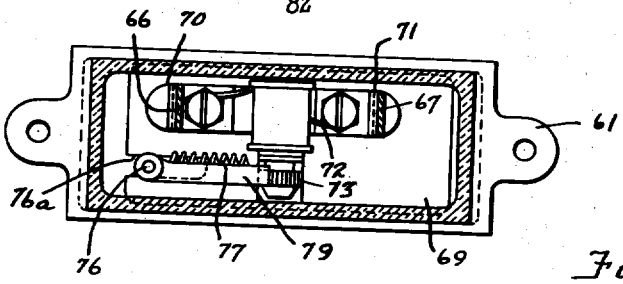
Fig. 4 is a view in section taken on the line 4—4 of Fig. 3.

Referring to Figs. 3 and 4, this modified form comprises the housing 60 provided with lugs 61. Terminals 62 and 63 are provided on the rear face of the housing and are secured thereto by the screws 64 and 65 passing through the housing, which screws also secure the contacts 66 and 67 within the housing. A plate 69 is slidably mounted within the housing and carries on its rear face the contacts 70 and 71 connected by the wire 72. The contacts 70 and 71 are adapted to engage the contacts 66 and 67 and are adapted to be locked in the position shown in Fig. 3. This locking means comprises a ratchet 73 soldered on to a shaft 74, which shaft is journaled in the lug 75 secured to the plate 69. An extension 76 secured to the front wall of the housing 60 and, passing through a slot 76a in the plate 69, supports one end of a spring 77 which, at its other end, is attached to an extension 78 secured to the movable plate 69. The extension 76 also has soldered to its outer end a spring clip 79, providing a pawl for engaging the ratchet 73.

The plate 69 is provided with an operating handle comprising an externally threaded rod 80 secured to the plate 69 and passing through an elongated slot 81 in the front panel of the housing. A knob 82 is threaded on the rod 80 whereby the movement of the rod laterally in the slot 81 will cause movement of the plate 69.

In operation overheating of the shaft 74 caused by excessive current flowing through the wire 72 will cause a melting of the solder securing the ratchet 73 to the shaft 74 and will allow the ratchet 73 to rotate, and the plate 69 will move to the left under the influence of the spring 77, thus breaking the contacts. Breaking of the contacts will allow the solder to again cool and solidify, whereby the device may be reset by moving the plate 69 to the right as indicated in Fig. 3.

It should be noted that this modification also embodies the heat lag between the heating coil and soldered joint.

Figure 5:
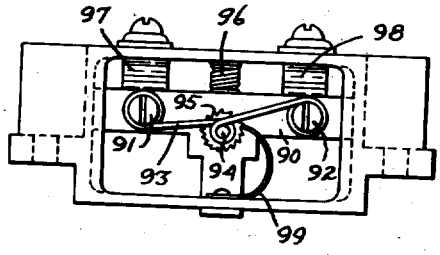
Fig. 5 is a top plan view of a second modified form of circuit breaking device.

A third modification has been disclosed in Fig. 5. This modification is similar in many respects to that shown in Figs. 3 and 4. In this case a movable plate 90, carrying the contacts 91 and 92 which are connected by a wire 93 surrounding the shaft 94 of a pinion 95, is adapted to move under the influence of the spring 96 to disengage the contacts 91 and 92 from the stationary contacts 97 and 98.

In normal operation, the pinion is soldered to the shaft 94 and the plate is held in the position shown in Figure 5, with the contacts 91 and 92 engaging the contacts 97 and 98 by means of the pawl 99 engaging the ratchet pinion 95. Upon excessive current flowing through the wire 93, the solder holding the ratchet pinion 95 on the shaft 94 will melt, which will allow the ratchet pinion 95 to rotate and consequently the plate 90 will move under the influence of the spring 96 to disengage the contacts.

This modification, it will be noted also includes the heating coil surrounding the shaft carrying the ratchet and constitutes another form of cut-out device in which there is provided a lag between the heating coil and the soldered joint.

In all of the modifications, the structure is comparatively simple, easy to assemble and disassemble and contains the minimum number of parts and contacts. In all the modifications, the locking means or part thereof is carried by the movable member. In addition, all of the modifications disclose the heating coil out of engagement with the soldered joint to provide a slight heat lag therebetween.

While the form of embodiment of the invention as herein disclosed constitutes a preferred form, it is to be understood that other forms might be adopted, all coming within the scope of the claims which follow.

What is claimed is as follows:

1. A circuit breaking device comprising a contact, a movable member, a second contact carried by said movable member, means for locking said movable member in position so that said second contact engages said first contact, means for moving said member in locking position, thermally actuated means for releasing said locking means upon excessive flow of current through said contacts, one of said contacts comprising spring means for snapping open said contacts upon the release of said locking means, said moving means also comprising means for manually releasing said locking means substantially as described.

2. A thermally operable circuit breaker comprising a self-opening switch, an electric heater connected in circuit with said switch, a heat conductor, a latch fixed upon said conductor by a fusible binder and adapted to be released by heat conducted by said conductor from said heater to said binder to fuse the same, a catch to engage said latch and hold said switch closed, and a single manually operated means to close said switch and engage said catch with said latch and operable by pressure exerted upon its outer end at an angle to its axis to release said catch from said latch.

MORTIMER W. FISH.
HARRY F. CLARK.